United States Patent [19]

Fujiyama et al.

[11] Patent Number: 5,167,174
[45] Date of Patent: Dec. 1, 1992

[54] SCREW DRIVING MACHINE WITH A BELT SUPPORT AND GUIDANCE MECHANISM

[75] Inventors: Takeo Fujiyama; Nobuo Motegi, both of Tokyo, Japan

[73] Assignee: Max Company, Inc., Tokyo, Japan

[21] Appl. No.: 715,964

[22] Filed: Jun. 17, 1991

[30] Foreign Application Priority Data

| Jun. 18, 1990 | [JP] | Japan | 2-64075[U] |
| Aug. 7, 1990 | [JP] | Japan | 2-83570[U] |
| Oct. 31, 1990 | [JP] | Japan | 2-113514[U] |
| Oct. 31, 1990 | [JP] | Japan | 2-113515[U] |
| Feb. 19, 1991 | [JP] | Japan | 3-013748[U] |

[51] Int. Cl.[5] .................................................. B25B 23/02
[52] U.S. Cl. ..................................... 81/434; 227/136
[58] Field of Search ................... 81/57.37, 431, 433, 81/434, 435; 227/136, 137, 139

[56] References Cited

U.S. PATENT DOCUMENTS

| 4,014,488 | 3/1977 | Potucek et al. | 227/136 X |
| 4,059,034 | 11/1977 | Hornung | 81/57.37 |
| 4,428,261 | 1/1984 | Takatsu et al. | 81/434 |
| 4,674,367 | 6/1987 | Aab et al. | 81/434 X |

Primary Examiner—James G. Smith
Attorney, Agent, or Firm—Cushman, Darby & Cushman

[57] ABSTRACT

A screw driving machine with a magazine for supporting a belt holding screws that are to be driven. The magazine also serves to guide the belt and screws into an operating position. The magazine is of a semielliptical shape with a guide passage therethrough.

10 Claims, 7 Drawing Sheets

SCREW DRIVING MACHINE WITH A BELT SUPPORT AND GUIDANCE MECHANISM

BACKGROUND OF THE INVENTION

1. Field of the Invention

The present invention is directed to a screw driving machine employing a screw conveyance belt which is made of a long, relatively narrow, sheet or of a long wide sheet folded on itself so as to form a belt. The shanks of screws are inserted through the belt at prescribed intervals so as to be supported by the belt. In particular, the present invention is a screw driving machine with a support and guides system for the screw conveyance belt.

2. Description of the Related Art

The screw conveyance belt of a conventional screw driving machine is not very long. Therefore, the belt is fitted in a screw conveyance belt feed mechanism provided in the nose member of the machine and is allowed to hang freely at portions of the belt outside of the feed mechanism. The belt flexes relatively easily due to the weight of the screws held and typically has notches on one edge for engagement by the feed claw of the belt feed mechanism. Therefore, if the belt is twisted halfway during the screw driving operation of the machine, the notch or the shank of the screw is likely to become caught upon entering the feed mechanism, thus hindering the feed of the screws. This is a problem particularly when the inclination of the end of the belt, which is held by the belt feed mechanism, and that of other portions of the belt, which hang down due to gravity, are different from each other as in the case where the machine is inclined at an angle. In such a case, the belt is twisted so that the notch thereof or the shank of the screw is more likely to get caught upon entering the feed mechanism. In addition, since the belt freely sways at the free portions every time the machine is moved, the belt is likely to interfere with the screw driving operation at the free end of the belt. For these reasons, the belt usually needs to be held at the free end by the person operating the machine.

To solve these problems, a screw driving machine having a guide member, provided for the screw conveyance belt, located at the side of the machine was developed as disclosed in the Japan Utility Model Application No. 26921/85. Although the movement of the belt into the screw conveyance belt feed mechanism is improved by the guide member, the belt is likely to become caught on the guide member at the belt inlet portion thereof. Still, the belt needs to be held at the free end thereof by an operator until some of the screws supported by the belt have been driven so that the flexure of the belt is minimized. Therefore, the efficiency of the screw driving operation of such machine is still not optimized.

SUMMARY OF THE INVENTION

The present invention was made in order to solve the above-mentioned problems found in conventional screw machines. Accordingly, it is an object of the present invention to provide a screw driving machine having a guide member for guiding a long screw conveyance belt. The guide member simultaneously functions to gradually guide the belt near the free end thereof to a screw conveyance belt feed mechanism, restrict the free movement of the belt, and securely feed the belt, thus improving the efficiency of the screw driving operation of the machine.

Screws which have their shanks inserted at prescribed intervals through the screw conveyance belt, and thus held by the belt, are driven one after another by the screw driving machine. The machine includes a screwdriver unit, an adapter, the screw conveyance belt feed mechanism, and a magazine. The screwdriver bit of the screwdriver unit is rotatable. The adapter includes a body attached to the screwdriver unit, and a nose member supported by the body of the adapter so that the nose member can be moved relative to the adapter body in the axial direction of the screwdriver bit. The screw conveyance belt feed mechanism is provided in the nose member so as to feed the screw conveyance belt in the nose member. The magazine constitutes the guide means, and is attached to the body of the adapter so that the magazine is located behind the nose member. The magazine has a semielliptic body and a screw conveyance belt guide passage passing therethrough, which guides the screw conveyance belt along the semielliptic periphery of the magazine. A narrow space in the magazine houses the shanks of the screws held by the belt. One end of the belt guide passage is open and opposed to the screw conveyance belt entrance port of the nose member. The other end of the guide passage may also be open and serves as a port for putting the belt into and out of the guide passage.

The screw conveyance belt is put into the magazine through the open end of the screw conveyance belt guide passage. Since the distance between the open end of the passage and the screw conveyance belt entrance port is so short that the screw conveyance belt is not likely to be twisted between the open end and the inlet port, the notched portion of the belt or the shanks of the screw do not become caught on the nose member at the belt entrance port thereof. Therefore, the belt can be smoothly fed without hindering machine operation.

The screw conveyance belt guide passage is semielliptically formed in the magazine along the periphery of the semielliptic body thereof so that a substantial portion of the belt is housed in the magazine at the beginning of the screw driving operation of the machine. Accordingly, even if the belt is very flexible, it does not swing substantially so as to interfere with the screw driving operation. As a result, the belt can be smoothly and securely fed, and does not need to be held by the person operating the machine. Therefore, the efficiency of the screw driving operation is improved.

If both the ends of the screw conveyance belt guide passage of the magazine are open, a screw conveyance belt of such large length that the trailing end thereof cannot be located in the passage at the beginning of the screw driving operation can also be used in the screw driving machine.

DETAILED DESCRIPTION OF THE PREFERRED EMBODIMENTS

Prererred embodiments of the present invention will be described below, in detail, with reference to the drawings attached hereto.

Figure 1:
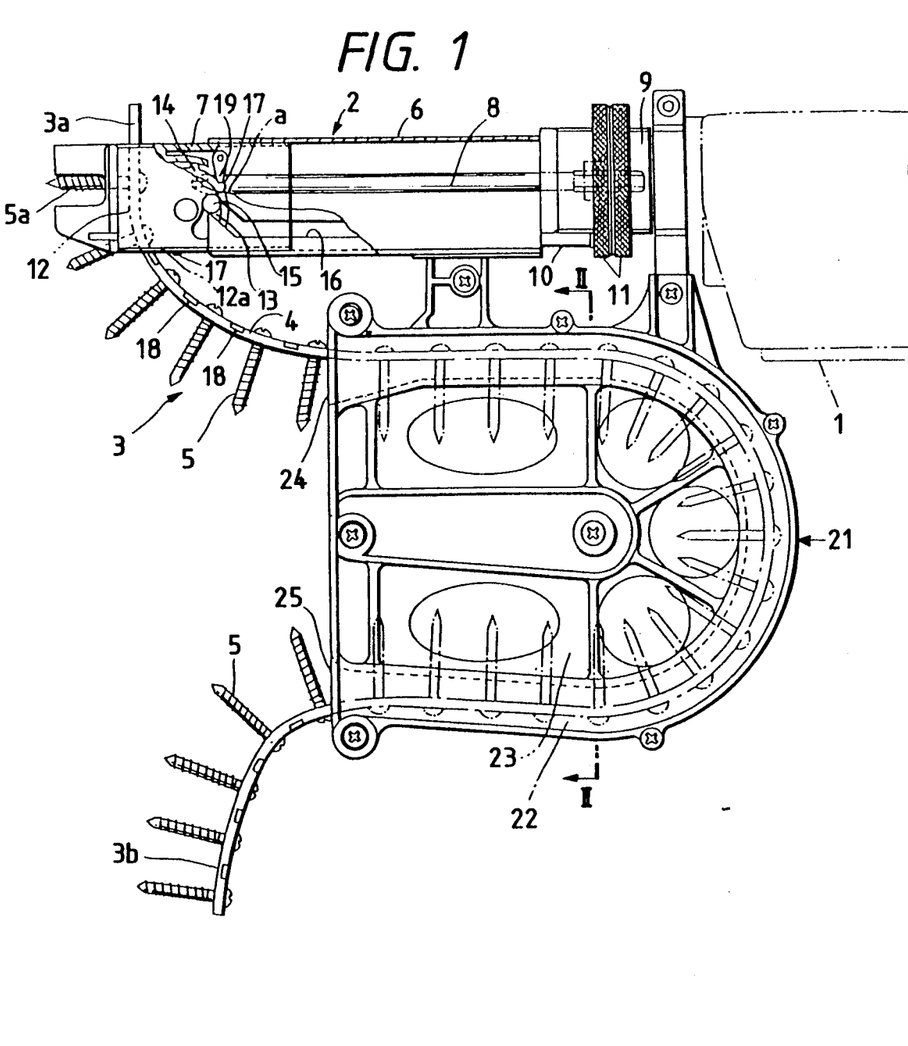
FIG. 1 is a side view, in partial section, of the first embodiment of the present invention.

FIG. 1 is a side view, partially in section, of a first embodiment of a machine according to this invention. The machine includes screwdriver unit 1, adapter 2, screw conveyance belt 3, and magazine 21. Screws 5 (two of which are indicated), held by belt 3, are driven one after another by the machine as the belt is fed gradually.

Screw conveyance belt 3 has long body 4 made of a synthetic resin or the like. Body 4 consists of a long sheet, a thin wide sheet folded on itself so as to yield a body of higher rigidity than the sheet itself, or the like. The shanks of screws 5 are inserted at prescribed intervals through body 4 of screw conveyance belt 3 so that screws 5 are held by the screw conveyance belt 3.

Adapter 2 is removably attached to screwdriver unit 1, and includes adapter body 6 and nose member 7, slidably supported by adapter 6.

Screwdriver unit 1 includes a motor, which is not shown in the drawings and can be actuated by pulling a trigger, or the like. Screwdriver bit 8 which projects from the tip of adapter body 6 is rotated by the motor.

An adapter body 6 houses a screwdriver bit 8. The end portion of the adapter body 6 is integrally coupled with a driver mounting portion 9 having a female screw portion at the inner periphery thereof. The adapter body 6 is mounted to the screwdriver unit 1 so that the female screw portion of the driver mounting portion 9 is threadedly engaged with a male screw portion, which is formed on the outer periphery of a boss portion provided at one end of the screwdriver unit 1. A nose member 7 is supported by the adapter body 6 so that the nose member 7 can be slide relative to the adapter body 6 in the axial direction of the screwdriver bit 8. The adapter body 6 is biased toward a tip end thereof. The adapter body 6 is provided with a stop rod 10 so that the stop rod 10 protrudes from the rear surface of the adapter body 6 when the nose member 7 is moved relative to the adapter body 6. The tip end of the stop rod 10 is brought into contact with an adjusting ring 11 which is threadedly engaged with a male screw portion formed on the outer periphery of the driver mounting potion 9, so that an end position of sliding stroke of the nose member 7 is determined by stopping the movement of the nose member 7 relative to the adapter body 6, via the stop rod 10. A mounting position of the adjusting ring 11 relative to the driver mounting portion 9 is adjusted in such a manner that the tip end of the screwdriver bit 8 housed in adapter 6 is slightly projected from the end of the nose member 7. Nose member 7 has guide space 12 extending perpendicularly to the direction of the sliding of the nose member 7 so as to guide screw conveyance belt 3, and is provided with screw conveyance belt feed mechanism a for feeding screws 5 one after another, along with the belt, to coincide with the axis of screwdriver bit 8 in nose member 7, synchronously with the screw driving operation of the machine. Belt feed mechanism a utilizes the relative movement of nose member 7 and adapter body 6 so that screw conveyance belt 3 introduced through inlet port 12a of guide space 12 is fed forward in the longitudinal axial direction of the screwdriver bit 8. Belt feed mechanism a includes one-way clutch 13, and feed wheel 14. When nose member 7 is slid backward in the longitudinal axial direction of the screwdriver bit 8 relative to adapter body 6, one-way clutch 13 is engaged with feed wheel 14 and turned through a prescribed angle while sliding pin 15 of clutch 13 is moved in sliding guide groove 16 of adapter body 6, as shown in FIG. 1. As a result of the turning of clutch 13, tooth 17 of feed wheel 14 is engaged in notch 18 of screw conveyance belt 3 to feed screw conveyance belt 3 by a distance corresponding to the distance between adjacent screws 5. Reverse turning preventive claw 19 is provided for feed wheel 14. Belt feed mechanism a is configured so that when nose member 7 is slid forth along the longitudinal axis of the screwdriver bit 8 relative to adapter body 6, clutch 13 is engaged with feed wheel 14 and turned through the prescribed angle.

When nose member 7 is slid back along the longitudinal axis of the screwdriver relative to adapter body 6, the leading one 5a of screws 5 held by screw conveyance belt 3 which is to be driven by the screw driving machine into workpiece 20, remains pressed on the tip of nose member 7. Belt feed mechanism a is put into action to feed screw 5a to a prescribed position in the nose member and the tip of screwdriver bit 8 is rotated by the motor while engaged in the groove of the head of screw 5a. When nose member 7 is slid back further, leading screw 5a projects from the tip of the nose member and begins to be driven into workpiece 20 by screwdriver bit 8. When nose member 7 is slid back to the end of the sliding stroke thereof, screw 5a is completely driven into workpiece 20. When workpiece 20 is thereafter separated from nose member 7, nose member 7 is slid forth relative to adapter body 6. At that time, one-way clutch 13 is turned back through a prescribed angle, but is not engaged with feed wheel 14, so that feed wheel 14 is not turned and screw conveyance belt 3 is therefore not fed.

Figure 2:
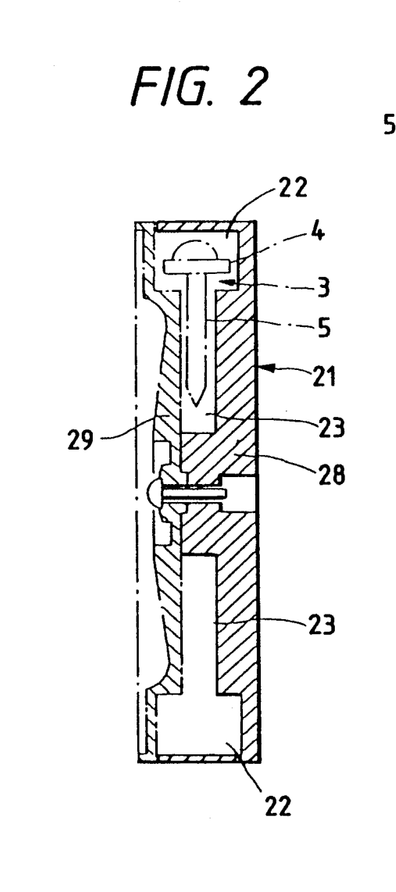
FIG. 2 is a sectional view of the machine shown in FIG. 1 along a line II—II.
Figure 3A:
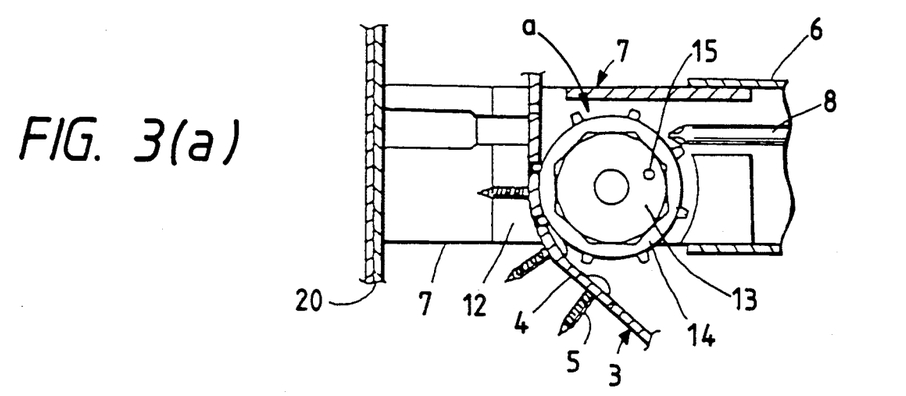
FIGS. 3(a), 3(b) and 3(c) are views illustrating the operation of the screw conveyance belt feed mechanism of the first embodiment.
Figure 3B:
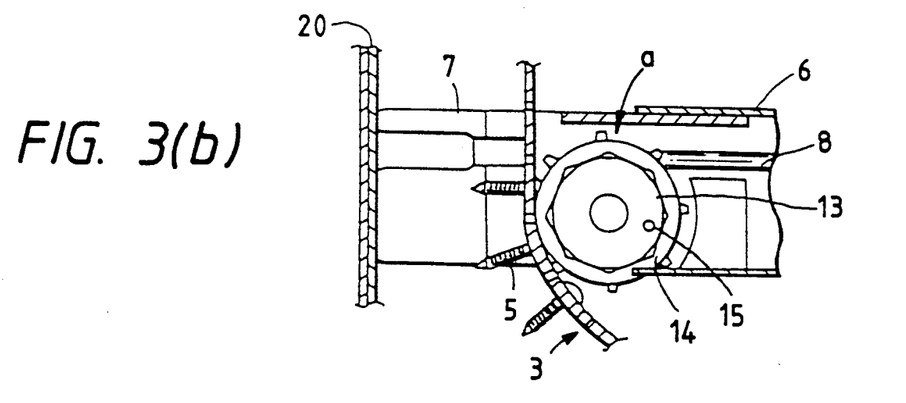
Figure 3C:
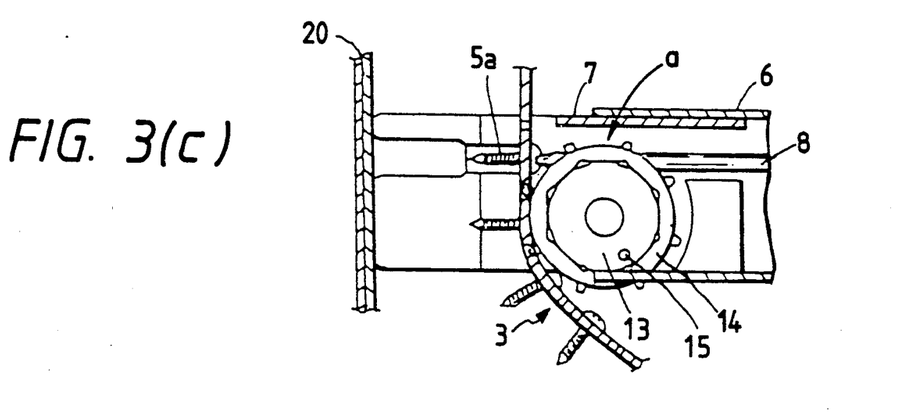

Magazine 21 is provided near adapter body 6 so as to feed screw conveyance belt 3 from magazine toward nose member 7, and has a semielliptic body as shown in FIGS. 1 and 2. The semielliptic body is located under nose member 7. Semielliptic long guide passage 22 for guiding screw conveyance belt 3 along the periphery of magazine 21 is provided in the semielliptic body thereof, as shown in FIG. 2. Narrow guide space 23, in which the shanks of screws 5 held by belt 3 are housed is provided in the semielliptic body of magazine 21 and extends inward from guide passage 22 in the radial direction of magazine 21 and along guide passage 22, as shown in FIG. 2. One open end 24 of guide passage 22 is proximate to belt inlet port 12a of nose member guide space 12. Guide passage 22 has a second open end 25.

To use magazine 21, one end of screw conveyance belt 3 is pushed into one of open ends 24 and 25 of guide passage 22 so that at least a portion of screw conveyance belt 3 is housed in guide passage 22, the shanks of screws 5 held by screw conveyance belt 3 are put in guide space 23, and leading end 3a of screw conveyance belt 3 is located outside open end 24 of guide passage 22. Leading end 3a of screw conveyance belt 3 is then inserted into guide space 12 of nose member 7 so that trailing end 3b of screw conveyance belt is located outside second open end 25 of guide passage 22.

Figure 4A:
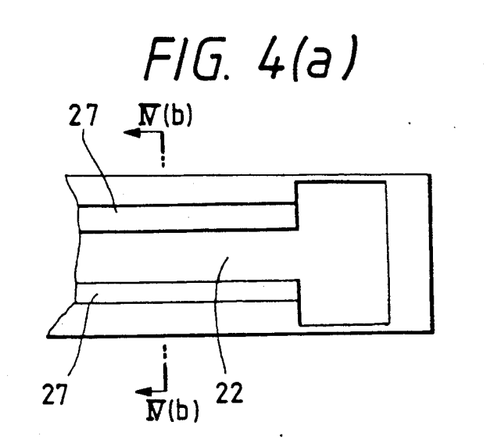
FIG. 4(a) is a front view of the screw conveyance belt guide passage of the first embodiment.
Figure 4B:
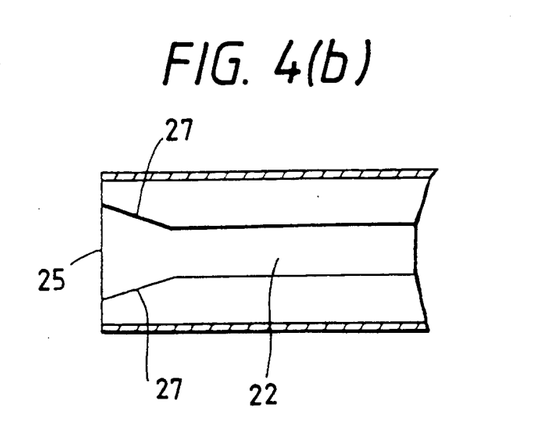
FIG. 4(b) is a sectional view of the passage shown in FIG. 4(a) along a line IV(b)—IV(b)

Magazine 21 has oblique surfaces 27 on narrow space 23 at open end 25 of the guide passage 22 so that screw conveyance belt 3 is smoothly pulled into magazine 21, as shown in FIGS. 4(a) and 4(b). Since the distance between open end 24 of guide passage 22 and nose member guide space 12 is short, screw conveyance belt 3 being fed through magazine 21, during the screw driving operation, will not tend to twist between open end 24 and guide space 12. Accordingly, the notched portion of screw conveyance belt 3 or the shank of screw 5 held by screw conveyance belt 3 does not become caught on nose 7 member at belt inlet port 12a. Therefore, screw conveyance belt 3 can be smoothly fed for the driving of screw 5 into workpiece 20. Since guide passage 22 is provided in a semielliptic form in the semielliptic body of magazine 21 along the periphery thereof, screw conveyance belt 3 is almost entirely housed in magazine 21 at the beginning of the screw driving operation so that even if screw conveyance belt 3 is very flexible, it will not tend to swing and interfere with the operation of the machine. Since screw conveyance belt 3 extends outside magazine 21 at free end 3b at the beginning of the screw driving operation, gravity acts on screw conveyance belt 3 in a direction so as to twist screw conveyance belt 3 if the screws 5 are driven into the workpiece 20 by an inclined machine. However, the rigidity of screw conveyance belt 3 tends to prevent twisting, because the length of the portion of screw conveyance belt 3, which extends from free end 3a thereof to open end 25 of magazine 21, is small. For that reason, even if screws 5 are driven into workpiece 20 by a machine that is inclined sideways, the shanks of screws 5 do not become caught on magazine 21 at open end 25 of guide passage 22 as the portion of screw conveyance belt 3, which extends from free end 3b to open end 25, is gradually moved into magazine 21. Since screw conveyance belt 3 is almost entirely housed in magazine 21 at the beginning of the screw driving operation, only the portion of screw conveyance belt 3, which extends from free end 3b of screw conveyance belt 3 to open end 25 of guide passage 22 can swing. This small motion does not interfere with operation. For this reason, that portion does not need to be held by the person operating the machine. Therefore, the efficiency of the operation is improved.

If screw conveyance belt 3 is relatively small in length, open end 25 of guide passage 22 of magazine 21 may be closed.

A screw driving machine of the second embodiment is described with reference to FIGS. 2 and 5 below. The machine Therefore, the portions of the machine, which are the same as, or correspond to those of the machine of the first embodiment, shown in FIG. 1, are denoted by the same reference symbols as the latter portions. In the second embodiment, shown in FIG. 5, mutually opposite walls 28 and 29 (see FIG. 2) of magazine 21, which define guide space 23 of magazine 21, are provided with engagement member 30 near open end 24 of guide passage 22 so that the shanks of screws 5 held by screw conveyance belt 3 are engaged with engagement member 30. It is preferable that engagement member 30 is slidably fitted in slender holes 31 formed in mutually opposite walls 28 and 29 so as to make it possible to adjust the position of engagement member 30 along the axial direction of screw 5.

Figure 5:
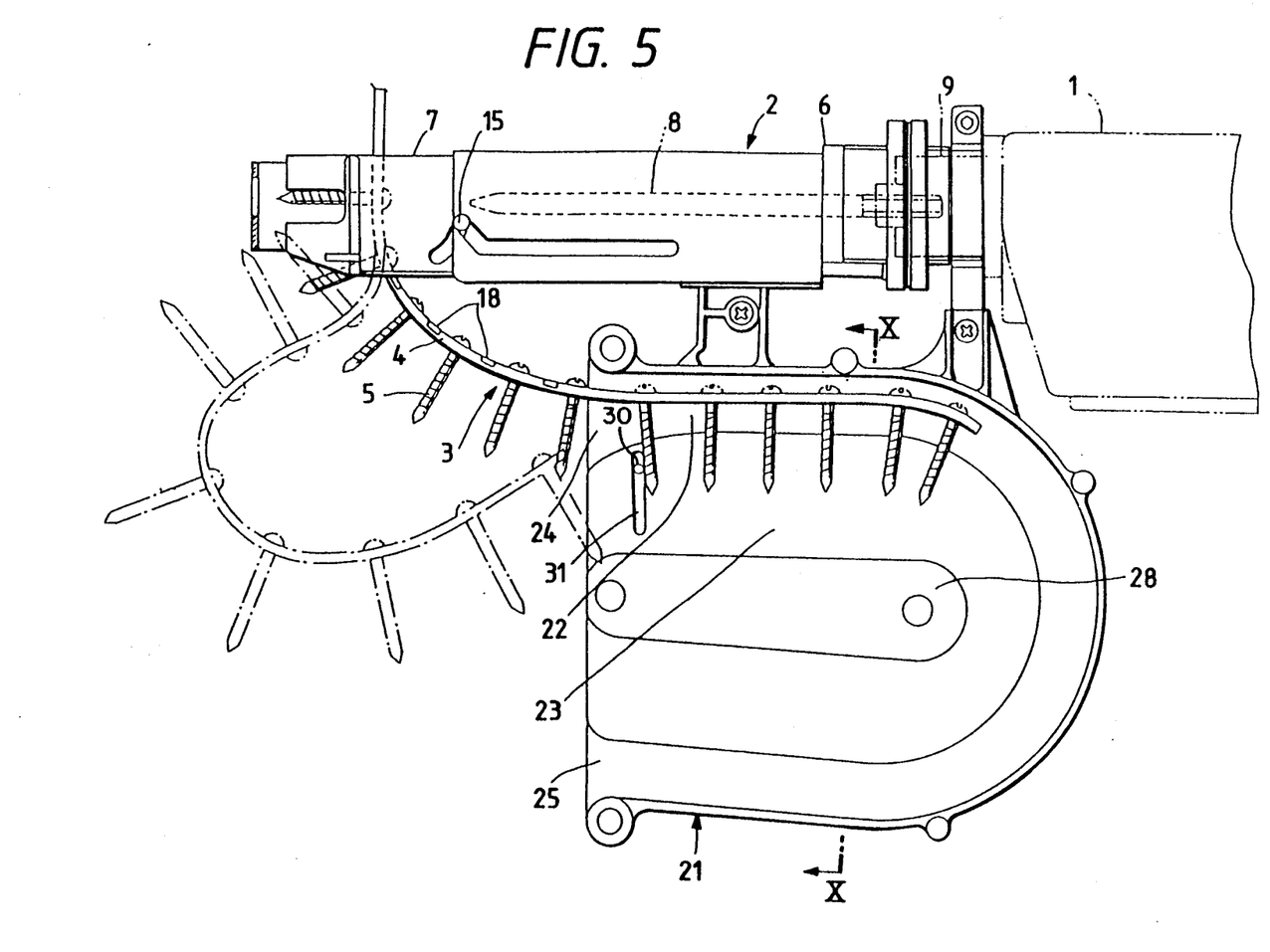
FIG. 5 is a side view, in partial section, of a screw driving machine of the second embodiment of the present invention.

When the number of screws 5 remaining in magazine 21 has become small, due to the advancement of the screw driving operation of the machine, and screws 5 are driven by the machine oriented downward, screws 5 in magazine 21 would tend to gravitate out of it as shown by the dotted lines in FIG. 5. However, the shank of screw 5 is engaged with engagement member 30 near open end 24 of guide passage 22 so that a resistance is applied against the free downward movement of screw 5 to prevent it from gravitating out of magazine 21. Therefore, interruption of the smooth feed of screws 5 and interference with operation of the machine is avoided.

Engagement member 30 can be slid in slender holes 31 so as to be set in an optimal position depending on the length of the shank of each screw 5 which is put in magazine 21.

Belt feed mechanism a of the screw driving machine functions so that when screw 5 is fed to nose member 7, nose member 7 is moved in such a direction as to decrease the distance between nose member 7 and open end 24 of guide passage 22 and screw conveyance belt 3 is therefore not pulled out of magazine 21. The screw conveyance belt 3 is pulled out of magazine 21 when nose member 7 is moved in such a direction as to increase the distance between nose member 7 and magazine 21, after the driving of screw 5. For this reason, the above-mentioned operation does not place a substantial load on the belt feed mechanism.

Figure 6:
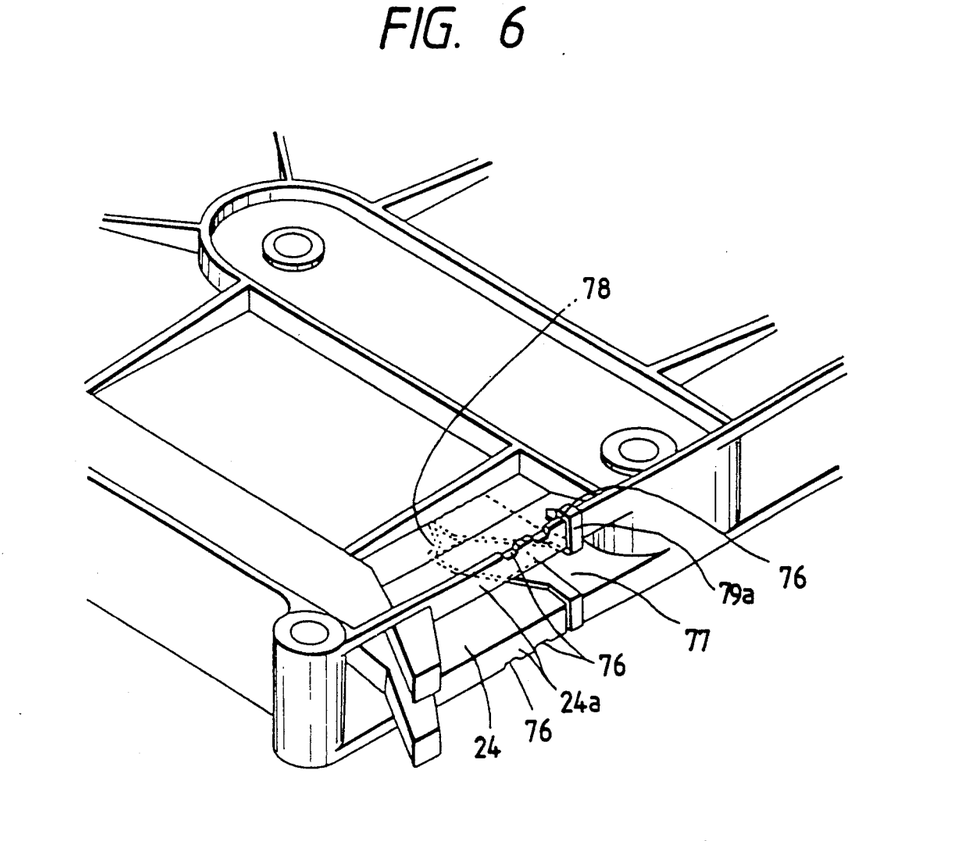
FIG. 6 is a perspective view of the screw conveyance belt drop prevention means of a screw driving machine of a third embodiment of the present invention.
Figure 7:
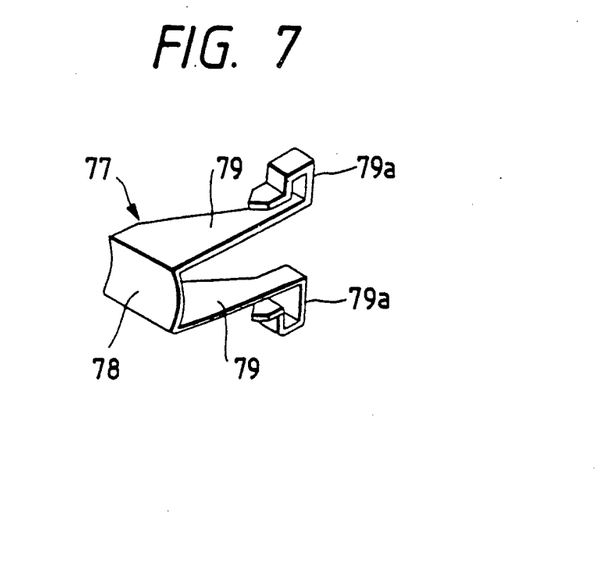
FIG. 7 is a perspective view of the stopper plate of the machine shown in FIG. 6.

A screw driving machine according to a third embodiment is described, with reference to FIGS. 6, 7 and 8, below. The machine is the same in basic construction as that shown in FIG. 1. Therefore, the portions of the machine, which are the same as those of the machine shown in FIG. 1, are denoted by the like reference numerals. In the embodiment shown in FIGS. 6, 7 and 8, a plurality of pairs of notches 76 are provided in edges 24a of magazine 21 at open end 24 of guide passage 22. Notches 76 are located at an interval along the axial direction of screw 5, as shown in FIG. 6. Stopper plate 77 is fitted on edges 24a of magazine 21. As shown in FIG. 7, stopper plate 77 is made of an elastic material, such as a synthetic resin or the like, and is substantially U-shaped. Stopper plate 77 has engagement surface 78 which is provided on the central portion of stopper plate 77 and located in screw shank guide space 23 of magazine 21 so that the shank of screw 5 is engaged with engagement surface 78. Stopper plate 77 also has hooks 79 at both ends. Hooks 79 are engaged with edges 24a of magazine 21. Tip portions 79a of hooks 79 are shaped so tip portions 79a can be fitted in notches 76 to apply an appropriate resistance to the sliding of screw 5 by virtue of the engagement of engagement surface 78 and the shank of screw 5. Depending on the length of the shank of screw 5, the appropriate notches 76 are selected for securing tip portions 9a.

When magazine 21 having notches 76 and stopper plate 77 is to be used, screw conveyance belt 3 of the screw driving machine is inserted into magazine 21 so that screw conveyance belt 3 is placed in guide passage 22 and the shanks of screws are placed in guide space 23. One end of screw conveyance belt 3 is taken out from open end 24 of guide passage 22, and put into guide space 12 of nose member 7. The other free end 3b of screw conveyance belt 3 is left outside the other open end 25 of guide passage 22.

When screws 5 are driven one after another by the machine in the same manner as described above with reference to the machine shown in FIG. 1, screw conveyance belt 3 is fed gradually through magazine 21. Since guide passage 22 extends in the semielliptic body of magazine 21 along the periphery of the body, screw conveyance belt 3 is mostly housed in magazine 21 at the beginning of the screw driving operation so that even if screw conveyance belt 3 is very flexible, it will not tend to swing and interfere with operation of the machine. Therefore, screw conveyance belt 3 can be smoothly and securely fed for the driving of screws 5. Since screw conveyance belt 3 extends outside of magazine 21 at free end 3b of screw conveyance belt 3 at the beginning of the screw driving operation, gravity acts on the belt so as to tend to twist screw conveyance belt 3 if the screw 5 is driven by the machine while inclined sideways. However, since the length of the portion of screw conveyance belt 3 which extends outside of magazine 21 at free end 3b of screw conveyance belt 3 is small, screw conveyance belt 3 is not likely to be twisted. For that reason, screw conveyance belt 3 does not need to be held the person operating the machine. Therefore, the efficiency of the screw driving operation is improved.

Figure 8:
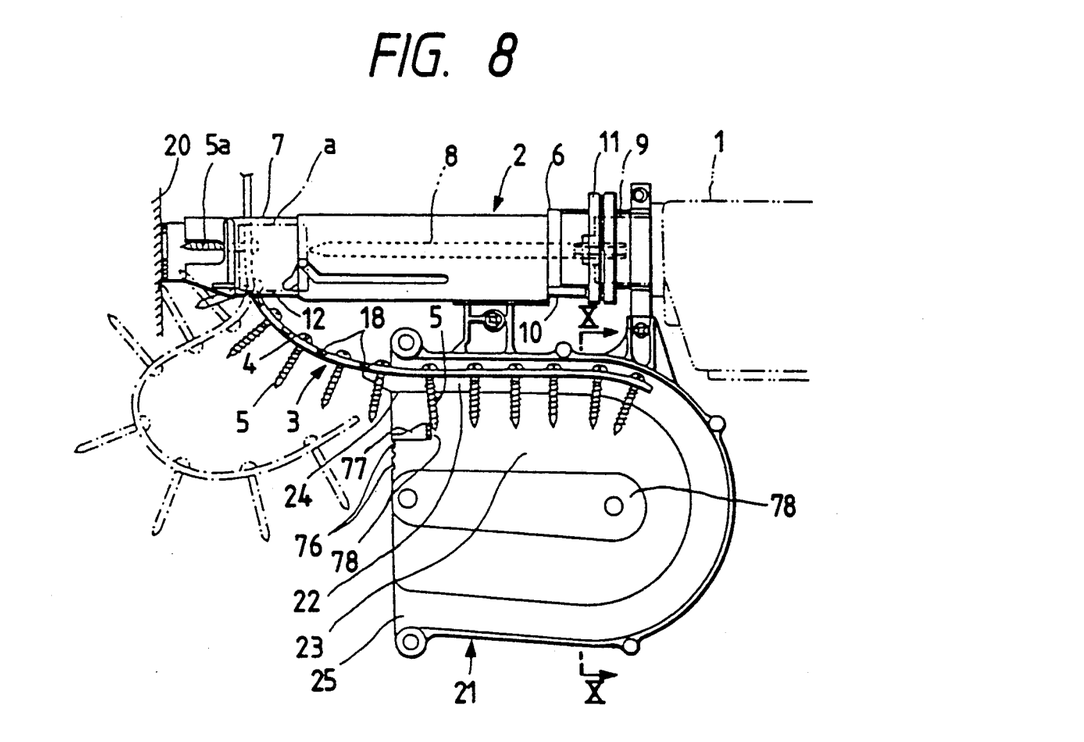
FIG. 8 is a side view, in partial section, of the machine shown in FIG. 6.

When the number of screws 5 in magazine 21 has become small due to the advancement of the screw driving operation and the screws 5 in nose member 7 of the machine are driven by the machine oriented downward, screws 5 in magazine 21 would be likely to gravitate out of it through open end 24 of belt guide passage 22 as shown by the dotted lines in FIG. 8. However, the shank of screw 5 in magazine 21 is engaged with elastic stopper plate 77 at open end 24 of guide passage 22 so that a resistance is applied against the free downward movement of screw 5 to prevent it from gravitating out of magazine 21. Stopper plate 77 can be displaced along the axial direction of screw 5 by fitting tip portions 79a of hooks 79 in any one of the pairs of notches 76 so as to adjust the position of stopper plate 77. An appropriate force can thus be applied to screw 5 depending on the length of the shank thereof so that the gravitation of screw 5 out of magazine 21 is prevented without hindering the feed of screw conveyance belt 3.

As described above, guide passage 22 is wide and guides screw conveyance belt 3 along the semielliptic periphery of magazine 21, and guide space 23 is narrow and houses the shanks of screws 5 to guide the shanks. Both are provided in magazine 21 of the screw driving machine shown in FIGS. 6, 7 and 8, so that guide passage 22 extends along the periphery of magazine 21, and guide space 23 extends along the inside of passage 22. Guide passage 22 has open end 24 opposed to the conveyance belt inlet port of nose member 7. The plural pairs of notches 76 are provided in edges 24a of magazine 21 at open end 24 of guide passage 22, and located at an interval along the axial direction of the shank of screw 5. Stopper plate 77 is engaged on edges 24a so that the shank of screw 5 is engaged with stopper plate 77. Stopper plate 77 is made of an elastic material, is substantially U-shaped, and has engagement surface 78 on the central portion and hooks 79 at both the ends. Engagement surface 78 is located in guide space 23 so that the shank of screw 5 is engaged with engagement surface 78. Hooks 79 are engaged on edges 24a and fitted in one of the pairs of notches 76. When screws 5 are driven one after another by the machine, screw conveyance belt 3 is fed gradually through the magazine 21. Since guide passage 22 is provided in a semielliptic form in magazine 21 along the periphery of the semielliptic body thereof, screw conveyance belt 3 is mostly housed in the magazine at the beginning of the screw driving operation of the machine so that even if the belt is very flexible, it does not swing substantially so as to interfere with operation. Even if the machine is inclined, screw conveyance belt 3 is not likely to be twisted. Accordingly, screw conveyance belt 3 does not need to be held by operating person. Therefore, the efficiency of the operation is improved.

When the number of screws 5 in magazine 21 has become small due to the advancement of the screw driving operation and the machine is oriented downward, the screws in magazine 21 would be likely to gravitate out of it through the open end of the guide passage 22. However, the shank of screw 5 in magazine 21 is engaged with elastic stopper plate 77 at the open end of guide passage 22 so that resistance is applied against the free downward movement of screw 5 to prevent it from gravitating out of magazine 21 through the open end of guide passage 22. Furthermore, stopper plate 77 can be displaced along the axial direction of screw 5 by fitting tip portions 79a of hooks 79 in any one of the pairs of notches 76. Accordingly, the appropriate force can be applied to screw 5 depending on the length of the shank thereof so that the gravitation of screw 5 out of magazine 21 is prevented without hindering the feed of screw conveyance belt 3.

Figure 9:
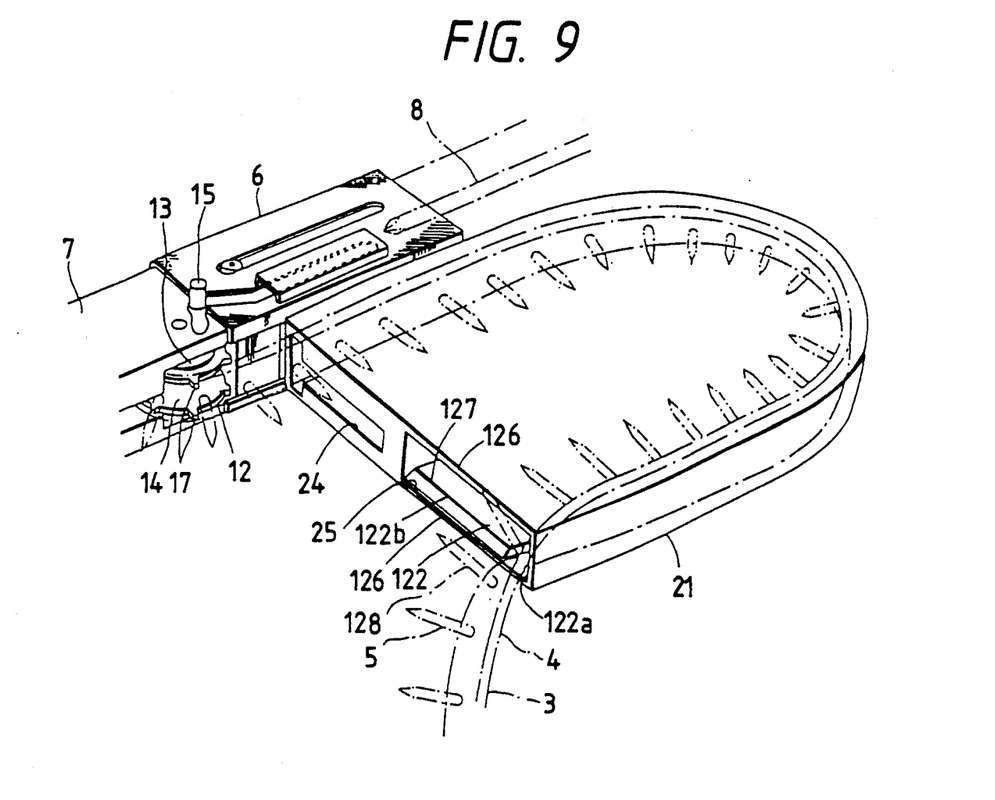
FIG. 9 is a perspective view a screw driving machine of a fourth embodiment of the present invention.
Figure 10A:
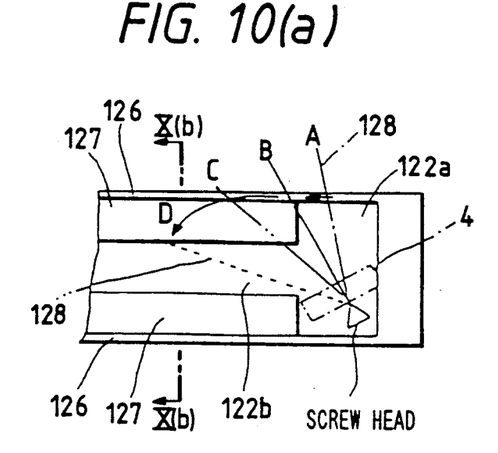
FIG. 10(a) is a front view of one open end of the screw conveyance belt guide passage of the machine shown in FIG. 9.
Figure 10B:
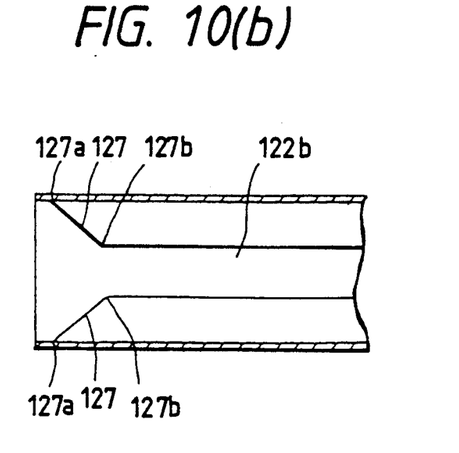
FIG. 10(b) is a sectional view of the passage along a line X(b)—X(b) shown in FIG. 10(a)

FIGS. 9, 10(a) and 10(b) show a screw driving machine according to yet another embodiment of the present invention. The machine is the same in basic construction as that shown in FIG. 1. Therefore, the portions of the machine which are the same as those of the machine shown in FIG. 1, are denoted by the same reference symbols. The semielliptic body of magazine 21 of the machine shown in FIGS. 9, 10(a) and 10(b) is located behind nose member 7 of the machine. Guide passage 122 for guiding screw conveyance belt 3 along the periphery of the magazine 21 is provided therein, as shown in FIG. 9. Guide passage 122 consists of outer wide belt guide portion 122a which houses and guides the screw conveyance belt 3, and inner arrow shank guide passage 122b which houses and guides shanks 128 of screws 5 held by screw conveyance belt 3. Both ends 24 and 25 of guide passage 122 are open. Screw conveyance belt 3 can be inserted into guide passage 122 from either of open ends 24 and 25 thereof, and is gradually fed through guide passage 122 from open end 25 toward open end 24 during operation. Open end 24 is opposed to belt inlet port 12a of nose member guide space 12. Both edge portions 126 of the body of the magazine 21, which extend on both the sides of open end 25 of guide passage 122, are a uniform distance from each other, as shown in FIGS. 10(a) and 10(b). Guide slopes 127 are provided at shank guide portion 122b of guide passage 122 so as to guide shank 128 of screw 5 moved to open end 25 of guide passage 122. Outer edge 127a of each of guide slopes 127 is located at a prescribed distance from the outer surface of corresponding edge portion 126 in the direction of the movement of screw 5. Inner edge 127b of each of guide slopes 127 is located at a prescribed distance from outer edge 127a thereof in the direction of the movement of screw 5.

To drive screws 5 one after another by the machine shown in FIGS. 9, 10(a) and 10(b), screw conveyance belt 3 is first put into magazine 21 so that body 4 of screw conveyance belt 3 is housed in belt guide portion 122a and shanks 128 of screws 5 are housed in shank guide portion 122b. When screws 5 are then driven one after another by the machine, screw conveyance belt 3 is guided in guide passage 122 so that screw conveyance belt 3 is not twisted in magazine 21. Even if screw conveyance belt 3 is very flexible, it will not swing substantially so as to interfere with the screw driving operation. Accordingly, screw conveyance belt 3 can be smoothly fed during the screw driving operation. If magazine 21 is postured so that both the sides thereof extend only horizontally, as shown in FIGS. 10(a) and 10(b), the portion of screw conveyance belt 3 which extends outside of magazine 21, at free end 3b of screw conveyance belt 3, tends to twist so that shank 128 of screw 5 held by this portion of screw conveyance belt 3 comes into contact with upper edge portion 126 over open end 25 as shown at A in FIG. 10(a) and slides on the edge portion as shown at B and C. However, since the distance between both edge portions 126 is uniform, shank 128 of screw 5 does not become caught on upper edge portion 126 but inclines in a natural direction while smoothly sliding thereon, so that shank 128 is smoothly guided into shank guide portion 122b of guide passage 122 by guide slope 127 as shown at D in FIG. 10(a). Since outer edge 127a of guide slope 127 is located at a prescribed distance from the outer surface of edge portion 126 in the direction of the feed of screw conveyance belt 3, shank 128 of screw 5 does not simultaneously slide on both outer edge 127a and guide slope 127. Thus, the area of contact of shank 128 and magazine 21 is very small, and the frictional resistance to the sliding of the shank on magazine 21 at open end 25 of guide passage 122 is low. Thusly, screw 5 can be smoothly guided into magazine 21.

Figure 11:
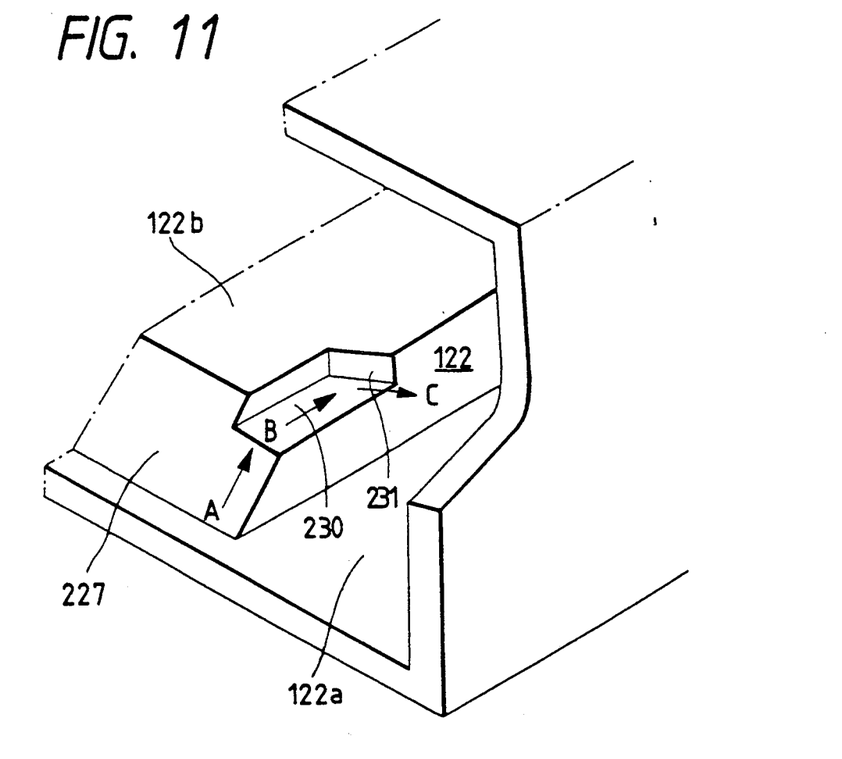
FIG. 11 is a perspective view of one open end of the screw conveyance belt guide passage of the magazine of a screw driving machine of a fifth embodiment of the present invention.
Figure 12:
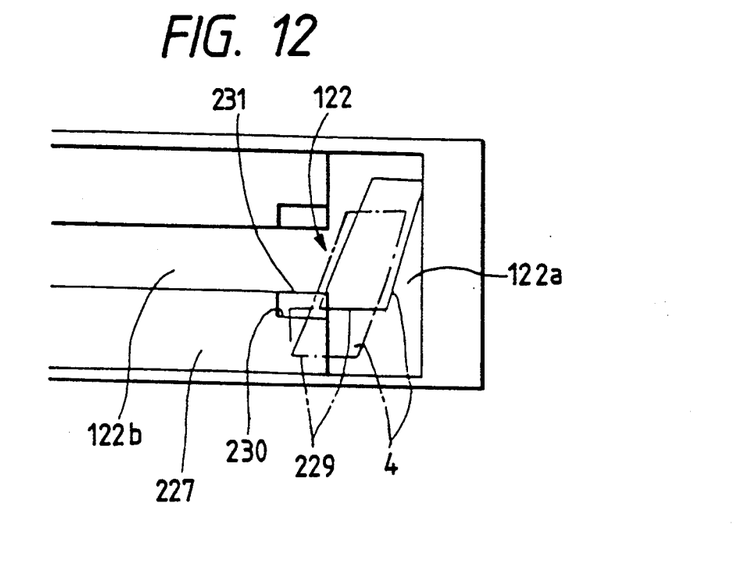
FIG. 12 is a front view of the open end of the passage shown in FIG. 11.

FIGS. 11 and 12 show a portion of a screw driving machine according to a further embodiment of the present invention. The machine is the same in basic construction as that shown in FIGS. 9, 10(a) and 10(b). Therefore, the portions of the machine which are the same as those of the machine shown in FIGS. 9, 10(a) and 10(b) are denoted by the same reference symbols. The inner portion of the body of magazine 21 of the machine shown in FIGS. 11 and 12 has shoulders at which screw conveyance belt guide portion 122a and shank guide passage 122b of guide passage 122 of magazine 21 join each other. Each of the shoulders has notch 230 into which corresponding side edge 229 of body 4 of screw conveyance belt 3 is moved as screw conveyance belt 3 is guided along guide slope 227 so as to guide shank 228 of screw 5 into shank guide portion 122b. Notch 230 is located at a distance from the outer edge of guide slope 227 in the direction of the feed of screw conveyance belt 3. Guide wall surface 231 is provided at the downstream end of notch 230 with regard to the direction of the feed of screw conveyance belt 3. Side edge 229 of screw conveyance belt 3 is engaged with guide wall surface 231 so as to be guided to belt guide passage 122a of guide passage 122 as screw conveyance belt 3 is fed for the driving of screw 5.

When screws 5, held by screw conveyance belt 3, are to be driven one after another by the machine shown in FIGS. 11 and 12, screw conveyance belt 3 is first put into magazine 21 so that body 4 of screw conveyance belt 3 is housed in belt guide passage 122a and shanks 228 of screws 5 are housed in shank guide portion 122b of guide passage 122. When screws 5 are then driven one after another by the machine, screw conveyance belt 3 is guided in guide passage 122. Therefore, screw conveyance belt 3 is not twisted in magazine 21 so that even if screw conveyance belt 3 is very flexible, it does not swing substantially so as to interfere with the screw driving operation. Therefore, screw conveyance belt 3 can be smoothly and securely fed for the driving of screws 5. S c r e w conveyance belt 3 extends outside of magazine 21 at the free end of the belt at the beginning of the screw driving operation. For that reason, if the magazine is postured so that both the sides thereof extend only horizontally at the beginning of the operation, as shown in FIG. 9, the portion of screw conveyance belt 3, which extends outside of magazine 21 at the free end thereof, tends to twist so that shank 228 of screw 5 is guided along guide slope 227 as shank 228 is moved into open end 25 of guide passage 122, as shown in FIG. 12. In such a case, side edge 229 of screw conveyance belt 3 guided along guide slope 227 is moved into notch 230 so that body 4 is prevented from being pulled into shank guide passage 122b.

When screw conveyance belt 3 is fed further along the shoulder at notch 230, side edge 229 is engaged with guide wall surface 231 so that side edge 229 is guided to belt guide passage. Side edge 229 is thus guided in directions A, B and C shown in FIG. 11, so that side edge 229 slides along guide slope 227 is directed into notch 230, and then guided to belt guide passage 122a by guide wall surface 231. Accordingly, body 4 of screw conveyance belt 3 is prevented from entering into shank guide passage 122b of guide passage 122, it virtually impossible to improperly feed screw conveyance belt 3.

What is claimed is:

1. A screw driving machine utilizing a long belt holding a plurality of screws to be driven, comprising:
   a housing;
   a rotary tool contained in said housing;
   a screwdriver bit operatively attached to said rotary tool;
   a nose member slidably attached to said housing so as to allow said nose member to move along a direction corresponding to a longitudinal axis of said screwdriver bit;
   ratcheting means, operatively engaged with said belt, capable of turning due to relative movement between said nose member and said housing, for advancing said belt and successively feeding each of said screws to an operating position opposite said screwdriver bit;
   an entrance port, formed in said nose member, so as to guide said belt toward said ratcheting means;
   an exit port, formed in said nose member, so as to allow said belt to exit said nose member after said screws have been driven;
   a magazine, fixedly attached to said housing, for supporting said belt behind a leading end thereof as said leading end enters said inlet port, said magazine having a semielliptically shaped guide passage through which said belt and screws contained therein pass, said magazine also including an inlet port located at a first end of said guide passage, where said belt enters said guide passage, and an outlet port located at a second end of said passage, where said belt exits said guide passage, said second end of said guide passage is proximate said entrance port of said nose member.

2. A screw driving machine as claimed in claim 1, wherein said guide passage comprises a relatively wide belt guide passage, for supporting and guiding said belt, and a relatively narrow screw shank guide passage for supporting and guiding shanks of said screws.

3. A screw driving machine as claimed in claim 2, wherein said belt guide passage and said screw shank guide passage are semielliptically shaped, said belt guide passage extending around a periphery of said screw shank passage.

4. A screw driving machine as claimed in claim 1 wherein said magazine is located at a side of said housing and said inlet port and said outlet port are oriented in a forward direction parallel with said longitudinal axis of said screwdriver bit.

5. A screw driving machine as claimed in claim 1, further comprising an engagement member located in said magazine proximate said outlet port so that the shank of a screw exiting said outlet port is slidably engaged with said engagement member so as to prevent said belt from dropping out of said magazine without hindering the feed of said belt by said ratcheting means.

6. A screw driving machine as claimed in claim 5, wherein the position of said engagement member can be adjusted so as to allow said engagement member to initially contact said screw exiting said outlet port at a predetermined location along the length thereof.

7. A screw driving machine as claimed in claim 5, wherein said engagement member is an elastic thin plate, said plate including at least one hook being adaptable to engagement with edges of said magazine proximate said outlet port, said plate is located in said magazine so as to engage with the shank of said screw exiting said outlet port.

8. A screw driving machine as claimed in claim 7, wherein said magazine has a plurality of engagement notches provided in its edges proximate said outlet port, said hook being adapted to fit in any one of said notches, said hook being fitted in a different one of said notches in a predetermined manner, so as to adjust a position of engagement between said engagement member and said screw exiting said outlet port.

9. A screw driving machine as claimed in claim 2, further comprising:
guide slopes located at a first end of said screw shank guide passage proximate said inlet port so as to guide a shank of a screw entering said guide passage.

10. A screw driving machine as claimed in claim 2, further comprising:
guide slopes located at a first end of said belt guide passage proximate said inlet port so as to guide portions of said belt entering said guide passage.

* * * * *